United States Patent [19]

Mniszewski et al.

[11] Patent Number: 4,731,840
[45] Date of Patent: Mar. 15, 1988

[54] METHOD FOR ENCRYPTION AND TRANSMISSION OF DIGITAL KEYING DATA

[75] Inventors: Susan M. Mniszewski; Edward A. Springer, both of Los Alamos, N. Mex.; David P. Brenner, North Collins, N.Y.

[73] Assignee: The United States of America as represented by the United States Department of Energy, Washington, D.C.

[21] Appl. No.: 730,529

[22] Filed: May 6, 1985

[51] Int. Cl.$^4$ .............................................. H04L 9/00
[52] U.S. Cl. ....................................... 380/21; 380/28; 380/43
[58] Field of Search .............. 178/22.07, 22.08, 22.09, 178/22.16; 380/24, 21, 23, 25, 28, 43, 44, 48

[56] References Cited

U.S. PATENT DOCUMENTS

| | | | |
|---|---|---|---|
| 4,193,131 | 3/1980 | Lennon et al. | 178/22.08 |
| 4,238,853 | 12/1980 | Ehrsam et al. | 178/22.16 |
| 4,315,101 | 2/1982 | Atalla | 380/24 |
| 4,322,576 | 3/1982 | Miller | 178/22.07 |
| 4,386,233 | 5/1983 | Smid et al. | 380/25 |
| 4,408,203 | 10/1983 | Campbell | 380/24 |
| 4,578,531 | 3/1986 | Everhart et al. | 380/21 |
| 4,605,820 | 8/1986 | Campbell, Jr. | 380/24 |

OTHER PUBLICATIONS

"DES Modes of Operation", FIPS pub #81, 12/2/80.
Miles E. Smid, "A Key Notarization System for Computer Networks," NBS special publication 500-54, U.S. Department of Commerce, Bureau of Standards, dated Oct. 1979.

*Primary Examiner*—Salvatore Cangialosi
*Assistant Examiner*—Aaron J. Lewis
*Attorney, Agent, or Firm*—Ray G. Wilson; Paul D. Gaetjers; Judson R. Hightower

[57] ABSTRACT

A method for the encryption, transmission, and subsequent decryption of digital keying data. The method utilizes the Data Encryption Standard and is implemented by means of a pair of apparatus, each of which is selectable to operate as either a master unit or remote unit. Each unit contains a set of key encryption keys which are indexed by a common indexing system. The master unit operates upon command from the remote unit to generate a data encryption key and encrypt the data encryption key using a preselected key encryption key. The encrypted data encryption key and an index designator are then downloaded to the remote unit, where the data encryption key is decrypted for subsequent use in the encryption and transmission data. Downloading of the encrypted data encryption key enables frequent change of keys without requiring manual entry or storage of keys at the remote unit.

24 Claims, 2 Drawing Figures

Microfiche Appendix Included
(2 Microfiche, 108 Pages)

METHOD FOR ENCRYPTION AND TRANSMISSION OF DIGITAL KEYING DATA

This disclosure of the present invention includes a microfiche appendix which is on file with the U.S. Patent and Trademark Office pursuant to the provisions of 37 CFR 1.96. The microfiche appendix includes a listing of a computer program which controls the apparatus of the invention and which implements the method of the invention.

BACKGROUND OF THE INVENTION

The invention described herein is generally related to methods and apparatus for the encryption and transmission of digital data. More particularly, this invention is related to data encryption and transmission systems which utilize the Data Encryption Standard promulgated by the United States Bureau of Standards. This invention is the result of a contract with the Department of Energy (Contract No. W-7405-ENG-36).

The widespread electronic transmission of digital data has created a need for increasingly efficient systems for the encryption and decryption of sensitive data. Previously known systems typically employ cryptoalgorithms which operate to encrypt digital data into an unintelligible form for transmission over non-secure communications channels, such as commercial telephone lines. In 1977 the U.S. National Bureau of Standards published a completely defined encryption algorithm, or cryptoalgorithm, which is known as the Data Encryption Standard (DES). This cryptoalgorithm is the U.S. standard for the encryption of sensitive unclassified data. The cryptoalgorithm is used by federal agencies for the transmission of sensitive unclassified data, and by private companies in applications such as electronic funds transfer. The DES is published in Federal Information Processing Standards Publication 46 (FIPS PUB 46) of the National Technical Information Service (1977), and in U.S. Pat. Nos. 3,796,830 to Smith and 3,798,359 to Feistel, which are hereby incorporated by reference.

The DES method of encryption utilizes a data encryption key which consists of a 64-bit binary word. The key is used as a variable element in a publicly known mathematical algorithm which convers digital data, typically in ASCII form, into an apparently random sequence of bits. Virtually any 64-bit binary word may be used as the data encryption key. However, the key must also be known to the receiver of the encrypted data, as it is required to decrypt the encrypted data by the standard DES decryption procedure. Thus, the same key must be known to both the sender and the receiver. Since both the encryption and decryption procedures are publicly known, the security of the key is crucial to the effective use of the DES. Effective key management is thus an important aspect of the use of the DES. Key management involves the secure generation, distribution, storage and destruction of cryptographic keys. In this regard, one source of randomly generated DES keys is the U.S. National Security Agency, which generates secure keys and distributes them to various federal agencies and U.S. government contractors which have a need for the encryption and transmission of sensitive unclassified data. However, keys may also be generated by private parties by any method considered suitably secure under the circumstances.

DES users typically change keys at frequent intervals. For example, federal agencies using the keys provided by the National Security Agency typically change keys on a daily basis. Keys have been stored in written form and kept secured in accordance with standard security procedures.

There are now available commercial devices which implement the DES encryption/decryption procedure. Such devices are in the form of integrated circuits which accept as a first input the data to be encrypted and as a second input a 64-bit key. Additionally, the commercially available DES devices typically have a capability for receiving the encrypted data as a third input in a feedback mode. This is known as cipher feedback, and operates to prevent the transmission of repetitive sequences of encrypted data when the data being encrypted contains repetitive sequences of identical characters. Cipher feedback encryption of data is generally regarded as superior to what is called "plain code book" encryption of data, in which text characters are converted on a one-to-one basis to code characters in accordance with a translation table. It will be recognized that, in plain code book encryption, repeating sequences of text characters are converted directly into repeating sequences of coded characters, thereby diminishing somewhat the integrity of the encrypted data.

One disadvantage of prior art systems is that the key must be manually loaded into the data encryption and decryption units. If the key is changed frequently, there is significant opportunity for error in the entry of the key.

SUMMARY OF THE INVENTION

Accordingly, it is the object and purpose of the present invention to provide a method for cryptographic communication of digital data.

More particularly, it is an object of the invention to provide a method for cryptographic communication of digital keying data, so as to enable subsequent transmission of data in encrypted form.

It is also an object and purpose of the invention to provide a method for enabling cryptographic communication between a master unit and a remote unit, wherein a data encryption key may be generated at the master unit and downloaded to the remote unit in encrypted form for subsequent use by both units.

In accordance with the present invention, there is provided a method for the encryption, transmission and decryption of digital keying data between a master unit and a remote unit. The method comprises the steps of storing in both the master unit and the remote unit a plurality of key encryption keys, with the key encryption keys in each unit being indexed by a common indexing system; selecting a master key encryption key from among the key encryption keys stored in the master unit; generating a data encryption key in the master unit; encrypting the data encryption key using the master key encryption key; downloading to the remote unit the encrypted data encryption key together with an index designator identifying the master key encryption key; and decrypting the encrypted data encryption key at the remote unit to thereby enable subsequent transmission of data between the remote and master units using the data encryption key to encrypt and decrypt the transmitted data.

In accordance with other aspects of the method described further below, the data encryption key is encrypted by a particular sequence of encryption processes, using the master key encryption key and selected other key encryption keys.

The method of the invention may be conducted with an apparatus which may serve as either the master unit or the remote unit. The apparatus includes memory means for storing a plurality of key encryption keys, and means for indexing the key encryption keys in the apparatus by means of a common indexing system; means for selecting a master key encryption key from among the key encryption keys stored in the apparatus; means for generating a data encryption key and encrypting the data encryption key using the master key encryption key; means for downloading from the master unit to the remote unit the encrypted data encryption key together with an index designator identifying the master key encryption key; and means for decrypting the encrypted data encryption key at the remote unit to thereby enable subsequent transmission of data between the remote and master units using the data encryption key to encrypt and decrypt and transmitted data.

These and other aspects of the invention will be more apparent upon consideration of the following detailed description and accompanying drawings of a preferred embodiment in the invention.

BRIEF DESCRIPTION OF THE DRAWINGS

The accompanying drawings, which are incorporated in and form part of the specification, illustrate an apparatus suitable for practicing the present invention and, together with the following description, serve to explain the principles of the invention. In the drawings.

DETAILED DESCRIPTION OF THE INVENTION

Figure 1:
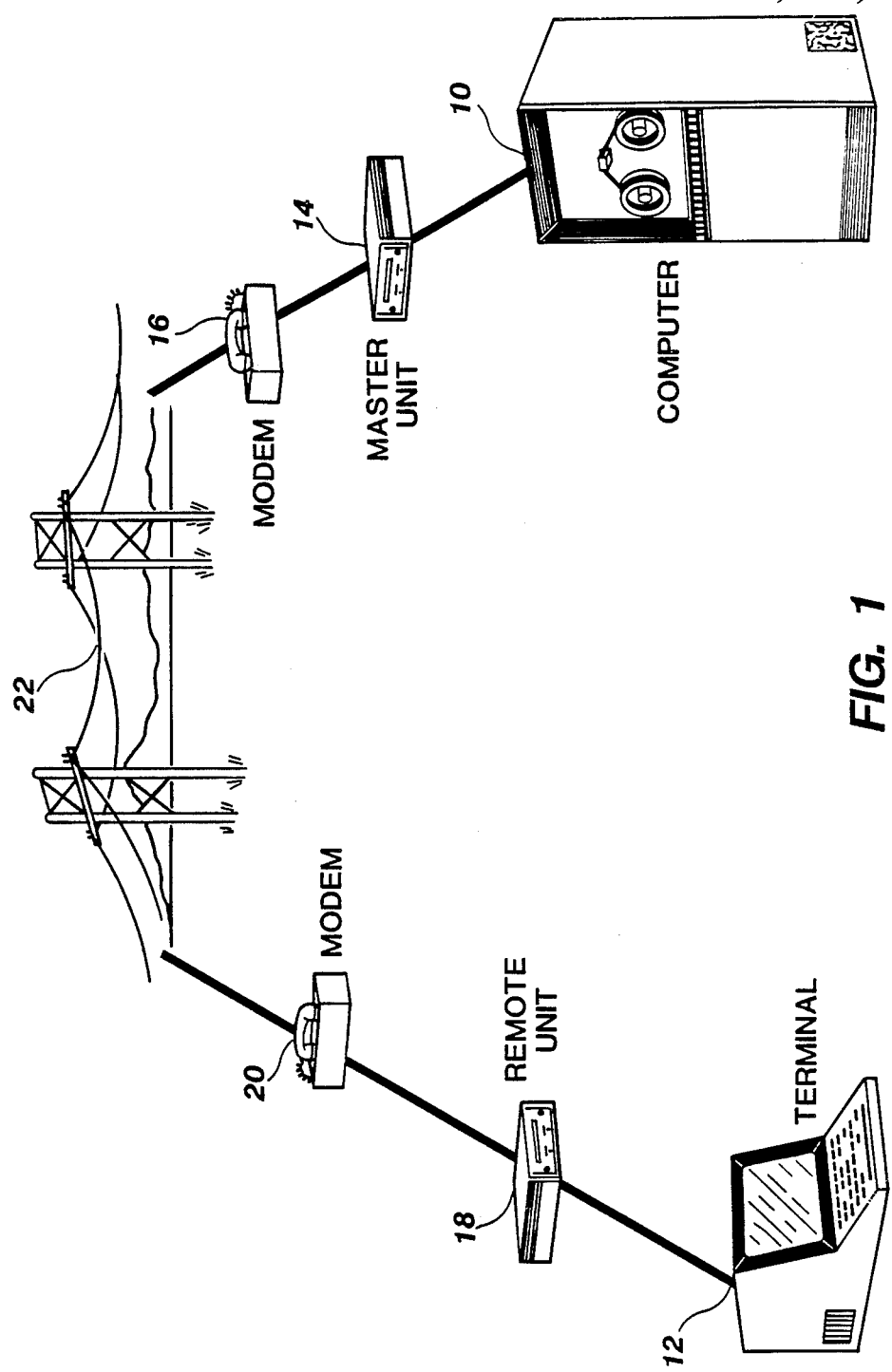
FIG. 1 is a simplified schematic drawing of an apparatus for implementing the present invention, as it may be installed to enable cryptographic communication between a computer facility and a remote terminal over non-secure commercial communication channels.

The overall operation of the present invention is illustrated in simplified schematic form in FIG. 1. Briefly, the method of the invention, when implemented by the apparatus described below, enables cryptographic communication between a computer 10 and a remote terminal 12. The computer 10 is connected to a master encryption/decryption unit 14, which is in turn connected to a conventional modem 16. The terminal 12 is similarly connected to a remote encryption/decryption unit 18, which is connected to a modem 20. Communication between the modems 16 and 20 may be over ordinary non-secure commercial communications lines 22.

As will be discussed further below, the master and remote encryption/decryption units 14 and 18 may be substantially identical, with their function under program control as either a master unit or a remote unit being selectable by means of a switch.

Figure 2:
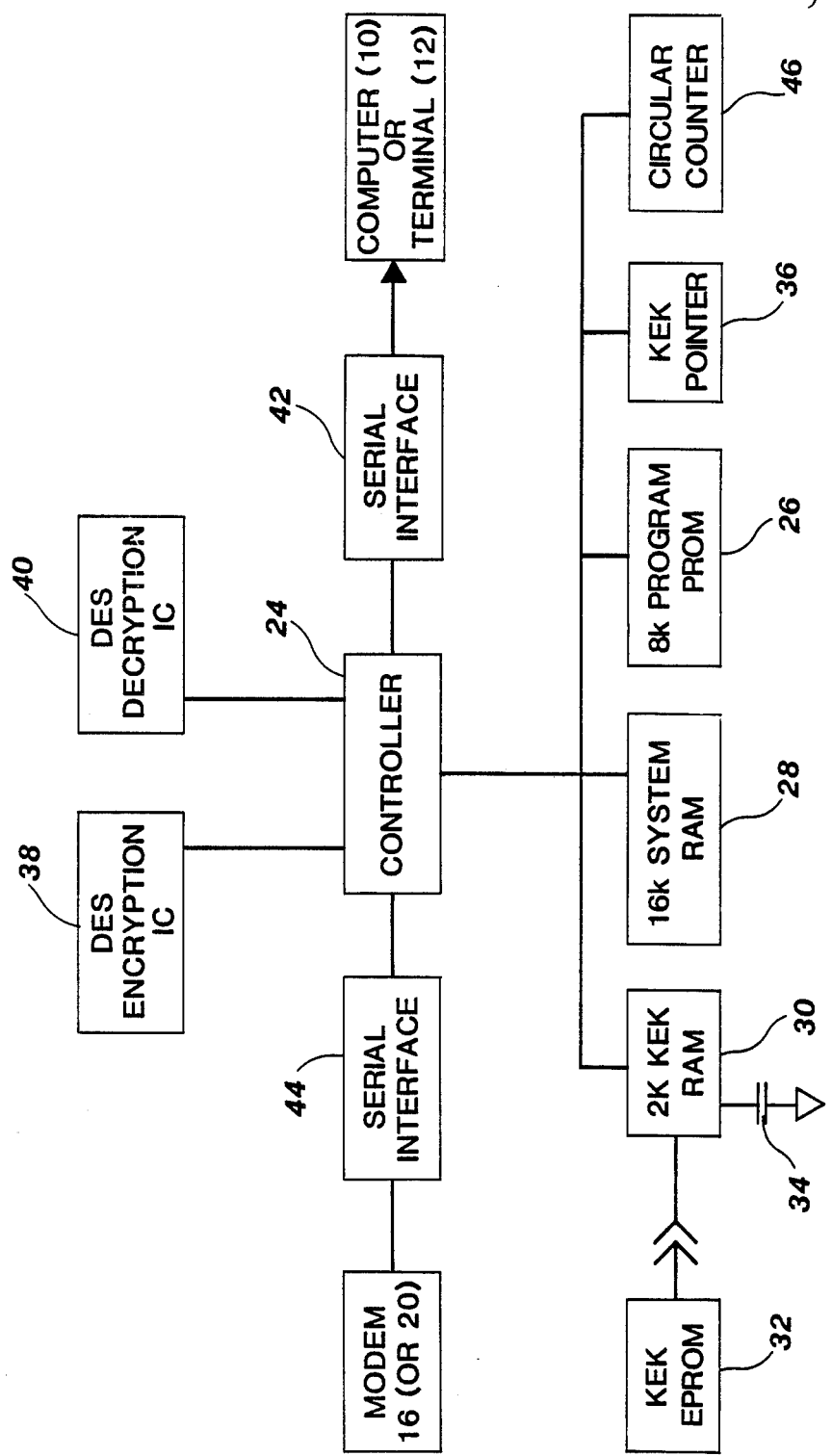
FIG. 2 is a schematic illustration of a circuit diagram of the apparatus, which may be either the master or the remote unit.

FIG. 2 illustrates in greater detail the encryption/decryption unit, which may be either the remote unit 18 or the master unit 14 of FIG. 1. The unit includes a central controller 24, which in the preferred embodiment is an Intel 80C31 central processing unit (CPU), which is commercially available from Intel Corp. Operation of the controller 24 is under control of a computer program which is stored in a programmable read-only memory (PROM) 26, which in the preferred embodiment is an Intel 27C64 8-kilobyte erasable PROM (EPROM). The program is written in the computer language known as PL/M-51, which is a high level language particularly adapted for use with the Intel 80C31 CPU. A complete listing of the program is set forth in the above-referenced microfiche appendix.

The unit further includes a 16-kilobyte system random access memory (RAM) 28 and a separate 2-kilobyte RAM 30 which is employed for the storage of approximately 200 key encryption keys (KEK's). As discussed below, key encryption keys are 64-bit binary words which are used in the apparatus and method of the invention. The KEK's must be secured at the level of security with which the data to be transmitted must be protected. The KEK's are normally stored in an erasable PROM 32 that is in the form of an insertable cartridge which may be inserted in the unit to load the KEK's into the KEK RAM 30. The KEK PROM 32 is ordinarily kept secured, and is only used to load the KEK's when the unit is to be activated for data transmission. When the unit is intentionally disabled or otherwise deactivated, for example, as a consequence of anti-tamper security switches which are included in the apparatus, the KEK's are erased from the KEK RAM 30. However, the apparatus includes a battery backup 34 which enables the apparatus to retain the KEK's stored in the volatile memory 30 in the event of a power failure.

A KEK pointer 36 connected to the controller 24 allows for manual designation of any particular KEK stored in the KEK RAM 30. The pointer is used in the encryption process discussed further below.

The apparatus further includes two DES encryption chips 38 and 40. In the preferred embodiment these are each commercially available AMZ8068 DES integrated circuits. One chip (38) is used for encryption of data to be transmitted by the unit, and the other chip (40) is used for decryption of encrypted data received by the unit.

The controller 24 is connected to the computer 10 (or the terminal 12 as the case may be) by means of a serial communications interface 42, which in the preferred embodiment is an Intel 82C51 serial interface. The controller 24 is connected to the modem associated with the unit by means of a second serial interface 44.

The apparatus further includes a circular 8-bit counter 46 which operates continuously and which is read by the controller 24 whenever the system is called on to generate a new data encryption key, as discussed further below.

In ordinary operation, all data transmitted between the computer 10 (or terminal 12) and the controller 24 is transmitted as clear (unencrypted) text, and all data transmitted between the controller 24 and the modem 16 (or 20) is transmitted in encrypted form, or as cipher text.

The method of the present invention uses two keys; a data encryption key (DEK) and a key encryption key (KEK). A DEK is generated, in the manner described below, for each data transmission session.

The KEK EPROM 32 ordinarily contains approximately 200 KEK's. The KEK's are generated by any suitable pseudorandom method, and must be stored and distributed in accordance with the appropriate key management system. Since the key PROM card is essentially a permanent record of the KEK's which will be used over a period of time, it must be secured and protected at the level of sensitivity of the data.

When the key PROM card is inserted into the unit, the KEK's are loaded into the RAM 30 of the unit. A particular KEK is selected by means of the KEK pointer 36, which consists of a three-digit thumbwheel which selectively identifies an address in the RAM. The KEK at an address identified by the thumbwheel will be referred to herein as the master KEK. As discussed below, at the beginning of each data transmission session the master KEK is used to generate a DEK, which is used for subsequent data transmission during the same session. The KEK's are not used to encrypt data during ordinary communication.

Communication is ordinarily initiated at the remote unit. At the beginning of a data transmission session, a command is transmitted from the remote unit to the master unit. As described further below, this command essentially triggers the master unit to generate a DEK and download it to the remote unit for use in subsequent transmission of data. In the preferred embodiment, this command, called a crypto-sync command, consists of a BREAK character followed by an arbitrary preselected 8-bit synchronization character. The synchronization character activates the master unit to generate a DEK, encrypt the DEK so generated, and download the encrypted DEK to the remote unit so that both units are provided with the DEK. The manner in which this is done is described below.

In the following discussions, the following variables and cryptographic operations will be referred to:
T = the integer value of the thumbwheel pointer setting
X = T+3
E = DES encryption using the KEK indexed by X
E' = DES encryption using the KEK indexed by X−1
E'' = DES encryption using the KEK indexed by X−2
E''' = DES encryption using the KEK indexed by X−3

In the foregoing equations, T and X are integers. For example, in one preferred embodiment the value of T is from 0 to 199; and X is thus from 3 to 202. E through E''' represent the DES encryption operation, using the various designated KEK's as the encryption keys. For example, the operator E''' represents the DES encryption operation using the KEK located at the address in the RAM which is pointed to when the value of the thumbwheel pointer is X−3, or T. Similarly, E'' represents DES encryption using the KEK located at the address pointed to by the value T of the thumbwheel pointer incremented by one, or T+1. In each of these encryption operations, simple code book encryption is conducted; that is, without any cipher feedback.

Upon receipt of the crypto-sync command, the master unit generates an initialization vector (IV) and a data encryption key (DEK), each of which are 64-bit binary words. The purpose and function of these parameters are discussed further below in the discussion of the subsequent encryption and transmission of data. The manner in which the IV and DEK are generated depends on whether or not the crypto-sync command is the first crypto-sync command the master unit has received since the master unit was last powered up. If the crypto-sync command is the first such command to be received since the power-up of the master unit, the master unit first generates an initialization vector (IV) and then generates a data encryption key (DEK). In the generation of the initialization vector, the master unit first reads the value of a circular 8-bit counter eight times to generate a pseudorandom 64-bit word. The eight bit counter is ordinarily actuated and initialized each time the master unit is powered up. The 64-bit word so generated is encrypted, using the DES, and using as the encryption key for this purpose the KEK located at the RAM memory location pointed to by the thumbwheel, i.e., using the encryption operation E'''. The encrypted value of the pseudorandom 64-bit word is the initialization vector (IV). The generation of the IV is represented by the following equation:

$$IV = E'''(Counter(1)).$$

where E''' represents DES encryption of the counter value, as described above.

The DEK is then generated by an operation represented by the following equation:

$$DEK = E'[E''(Counter(2) + IV)],$$

where Counter(2) is a 64-bit word obtained by reading the 8-bit counter eight times; and where E' and E'' represent the encryption operations defined above. In the above equation, it will be noted that the plus (+) operation means the EXCLUSIVE OR operation by which binary words may be combined. In this regard, the IV generated in the previous step and the 64-bit word generated from the counter are combined by means of the EXCLUSIVE OR operation to generate a 64-bit word which is encrypted first by means of the E'' operation and subsequently by means of the E' operation.

If the master unit receives a crypto-sync command which is not the first such command to be received since the master unit was last powered up, the DEK is generated in a slightly different manner from that described above. In such case, the initialization vector (IV) is generated by the operation defined by the equation:

$$IV = E'''(Cipher),$$

where Cipher is the 64-bit word created by stringing together the eight most recently generated 8-bit cipher text bytes. The DEK is then generated by the operation defined by the equation:

$$DEK = E'[E''(Counter(3) + IV)];$$

where Counter(3) represents the 64-bit word obtained by reading the 8-bit counter eight times, and where IV is defined above.

Once the IV and DEK have been generated, by either one of the two procedures described above, the DEK is encrypted with the KEK indexed by X, i.e., the encrypted DEK is produced by the operation E(DEK). The master unit then transmits to the remote unit the encrypted DEK; the initialization vector (IV); and the value of X. In this regard, the values of IV and X are transmitted in plain text, or in non-encrypted form.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A cryptographic method for encrypting, transmitting and decrypting keying data between a master unit and at least one remote unit, comprising the steps of:
   storing in said master unit and in said remote unit a plurality of key encryption keys, said key encryption keys being addressed by means of a common addressing system in each unit;
   generating a first storage address effective to identify a master key encryption key from said plurality of key encryption keys;
   indexing said first storage address by a first predetermined amount to define a second storage address effective to identify a first key encryption key from said plurality of key encryption keys;
   indexing said first storage address by a second predetermined amount to define a third storage address effective to identify a second key encryption key from said plurality of key encryption keys;
   generating a data encryption key in said master unit, using said first key encryption key;
   encrypting said data encryption key using said second key encryption key to produce an encrypted data encryption key;
   downloading to said remote unit said encrypted data encryption key together with a designator value for identifying the address of said second key encryption key at said remote unit;
   decrypting said encrypted data encryption key at said remote unit to reproduce said data encryption key at said remote unit;
   whereby there is enabled subsequent transmission of data between said master unit and said remote unit, using said data encryption key to encrypt and decrypt said data.

2. The method defined in claim 1 wherein all encryption and decryption is performed using a DES mode of encryption and decryption.

3. The method of claim 1 wherein said data encryption key is generated in said master unit by a first method when said data encryption key is the first data encryption key to be generated following actuation of the master unit, and wherein said data encryption key is generated by a second method when said data encryption key is being generated subsequent to previous actuation of the unit and generation of a first data encryption key.

4. The method of claim 3 wherein said first method comprises the steps of:
   generating an initialization vector;
   combining said initialization vector with an arbitrary binary word by a logical EXCLUSIVE OR operation; and
   encrypting the combination of said initialization vector and said arbitrary word to produce said data encryption key.

5. The method of claim 4 wherein said initialization vector is generated by DES encryption of a first arbitrary binary word read from a circular counter which is actuated whenever said master unit is powered.

6. The method of claim 5 wherein said first arbitrary binary word is encrypted using said master key encryption key.

7. The method of claim 6 wherein said data encryption key is generated by encrypting the EXCLUSIVE OR combination of said initialization vector and a second arbitrary binary word read from said circular counter.

8. The method of claim 7 wherein encrypting said EXCLUSIVE OR combination of said initialization vector and said second arbitrary binary word includes the steps of:
   indexing said first storage address by a third predetermined amount to define a fourth storage address effective to identify a third key encryption key;
   encrypting said combination by two successive DES encryptions using said third and said second key encryption keys.

9. The method of claim 3 wherein said second method comprises the steps of:
   generating an initialization vector;
   combining said initialization vector with an arbitrary binary word by a logical EXCLUSIVE OR operation; and
   encrypting the combination of said initialization vector of said arbitrary word to produce said data encryption key.

10. The method of claim 9 wherein said initialization vector is generated by encrypting a binary word derived from previously encrypted data.

11. The method of claim 10 wherein said initialization vector is generated by encryption using said master key encryption key.

12. The method of claim 11 wherein said arbitrary binary word is derived by stringing together a plurality of previously generated encrypted data words and encrypting said plurality of encrypted data words.

13. The method of claim 12 wherein said plurality of encrypted data words are encrypted using a key encryption key stored at a location which is indexed in a predetermined manner to said master key encryption key address.

14. The method of claim 13 wherein said arbitrary binary word and said initialization vector are logically combined by said EXCLUSIVE OR operation and wherein encrypting the combination of said arbitrary binary word and said initialization vector includes the steps of:
   indexing said first storage address by a third predetermined amount of define a fourth storage address effective to identify a third key encryption key;
   encrypting said combination by two successive DES encryptions using said third and said second key encryption keys.

15. The method of claim 1 wherein said data encryption key is generated in said master unit by a first method when said data encryption key is the first data encryption key to be generated following actuation of said master unit, and wherein said data encryption key is generated by a second method when said data encryption key is being generated subsequent to previous actuation of said master unit and generation of a data encryption key; said first method comprising the steps of:
   (a) generating an initialization vector;
   (b) combining said initialization vector with an arbitrary binary word by a logical EXCLUSIVE OR operation; and
   (c) encrypting the combination of said initialization vector and said arbitrary word to produce a data encryption key;

and wherein said second method comprises the steps of:

(d) generating an initialization vector;

(e) combining said initialization vector with an arbitrary binary word by a logical EXCLUSIVE OR operation; and (f) encrypting the combination of said initialization vector and said arbitrary word to produce a data encryption key.

16. The method of claim 15 wherein the generation of said initialization vector in step (a) is conducted by DES encryption of a first arbitrary binary word read from a circular counter which is actuated each time said master unit is powered.

17. The method of claim 16 wherein said first arbitrary binary word is encrypted using said master key encryption key.

18. The method of claim 17 wherein said data encryption key is generated by encrypting the EXCLUSIVE OR combination of said initialization vector and a second arbitrary binary word read from said circular counter.

19. The method of claim 18 wherein encrypting said EXCLUSIVE OR combination of said initialization vector and said second arbitrary binary word includes the steps of:

indexing said first storage address by a third predetermined amount to define a fourth storage address effective to identify a third key encryption key;

encrypting said combination by two successive DES encryptions using said third and said second key encryption keys.

20. The method of claim 19 wherein said initialization vector is generated in step (d) by encrypting a binary word derived from previously encrypted data.

21. The method of claim 20 wherein said initialization vector generated in step (d) is generated by encryption using said master key encryption key.

22. The method of claim 21 wherein said arbitrary binary word in step (e) is derived by stringing together a plurality of previously generated encrypted data words and encrypting said plurality of encrypted data words.

23. The method of claim 22 wherein said plurality of encrypted data words are encrypted using a key encryption key stored at a location which is indexed in a predetermined manner to said master key encryption key address.

24. The method of claim 23 wherein said arbitrary binary word of step (e) and said initialization vector of step (d) are logically combined by said EXCLUSIVE OR operation, and wherein encrypting the combination of said arbitrary binary word and said initialization vector includes the steps of:

indexing said first storage address by a third predetermined amount to define a fourth storage address effective to indentify a third key encryption key;

encrypting said combination by two successive DES encryptions using said third and said second key encryption keys.

* * * * *